(12) United States Patent
Xiong et al.

(10) Patent No.: US 10,928,360 B2
(45) Date of Patent: Feb. 23, 2021

(54) AUTOMATIC CAR BODY WELDING SPOT INSPECTION SYSTEM AND ITS CONTROL METHOD

(71) Applicant: Shanghai Evertec Robot Technology Co., Ltd., Shanghai (CN)

(72) Inventors: Weibin Xiong, Shanghai (CN); Bin Sun, Beijing (CN); Gaokun Li, Shanghai (CN)

(73) Assignee: SHANGHAI EVERTEC ROBOT TECHNOLOGY, Ltd., Shanghai (CN)

( * ) Notice: Subject to any disclaimer, the term of this patent is extended or adjusted under 35 U.S.C. 154(b) by 120 days.

(21) Appl. No.: 16/205,835

(22) Filed: Nov. 30, 2018

(65) Prior Publication Data

US 2019/0170694 A1 Jun. 6, 2019

(30) Foreign Application Priority Data

Dec. 1, 2017 (EP) .................................... 17204928

(51) Int. Cl.
| | |
|---|---|
| *G01N 27/90* | (2006.01) |
| *G01N 27/9013* | (2021.01) |
| *B25J 19/02* | (2006.01) |
| *B23K 31/12* | (2006.01) |
| *G01M 17/007* | (2006.01) |
| *B62D 27/02* | (2006.01) |
| *B62D 65/02* | (2006.01) |

(52) U.S. Cl.
CPC ......... *G01N 27/902* (2013.01); *B23K 31/125* (2013.01); *B25J 19/02* (2013.01); *G01M 17/007* (2013.01); *B62D 27/02* (2013.01); *B62D 65/02* (2013.01)

(58) Field of Classification Search
CPC ..... G01N 27/902; B23K 31/125; B25J 19/02; G01M 17/007
See application file for complete search history.

(56) References Cited

U.S. PATENT DOCUMENTS

| | | | | |
|---|---|---|---|---|
| 4,857,260 | A  * | 8/1989 | Schoenig, Jr. ....... | B23K 37/047 376/245 |
| 6,526,114 | B2 * | 2/2003 | Paillaman ............. | G21C 17/01 376/249 |
| 8,217,646 | B2 * | 7/2012 | Karpen ............. | G01N 21/8806 324/219 |

(Continued)

*Primary Examiner* — Patrick Assouad
*Assistant Examiner* — Demetrius R Pretlow
(74) *Attorney, Agent, or Firm* — Burr & Forman, LLP

(57) ABSTRACT

This invention is directed to an automatic inspection system of welding spots in the car body and a control method thereof, the automatic inspection system comprising a controller and a robot arm, a probe device, and a visual system, wherein the robotic arm holds a camera and the probe device, the probe device targets at car body welding spot and form the first included angle with the camera. Many lighting sources are distributed around the camera, which form the second included angle with the camera. The camera is connected with Image Collecting and Processing Device to obtain position data of welding spot in the car body, the controller is connected with Image Collecting and Processing Device by network, and foresaid controller rectifies position of the probe on the robotic arm according to the position of welding spot in the car body.

11 Claims, 7 Drawing Sheets

(56) References Cited

U.S. PATENT DOCUMENTS

| | | | |
|---|---|---|---|
| 2001/0021898 A1* | 9/2001 | Greer | G01B 11/00 |
| | | | 702/104 |
| 2010/0008462 A1* | 1/2010 | Killian | G01N 29/265 |
| | | | 376/259 |
| 2012/0180318 A1* | 7/2012 | Seki | B23K 9/0052 |
| | | | 30/123 |
| 2013/0193960 A1* | 8/2013 | Nishimizu | G01N 27/82 |
| | | | 324/240 |
| 2014/0049254 A1* | 2/2014 | Kubota | G01N 27/72 |
| | | | 324/228 |
| 2015/0018998 A1* | 1/2015 | Cho | G05B 19/41875 |
| | | | 700/109 |
| 2015/0122055 A1* | 5/2015 | Puckett | G01N 29/04 |
| | | | 73/865.8 |
| 2015/0148949 A1* | 5/2015 | Chin | B05D 1/02 |
| | | | 700/245 |
| 2015/0258694 A1* | 9/2015 | Hand | B25J 9/1015 |
| | | | 29/890.031 |
| 2015/0346033 A1* | 12/2015 | Song | G01J 5/0018 |
| | | | 219/78.01 |
| 2015/0347396 A1* | 12/2015 | Goldberger | G01M 99/00 |
| | | | 704/3 |
| 2016/0016312 A1* | 1/2016 | Lawrence, III | G01N 21/9515 |
| | | | 700/98 |
| 2016/0252464 A1* | 9/2016 | Ito | H05B 6/36 |
| | | | 348/128 |
| 2017/0284970 A1* | 10/2017 | Edwards, II | G01N 29/043 |
| 2017/0336361 A1* | 11/2017 | Kobayashi | G01N 27/902 |
| 2018/0117718 A1* | 5/2018 | Rajagopalan | B23K 37/0531 |
| 2019/0077472 A1* | 3/2019 | Harris | G01N 29/225 |

* cited by examiner

AUTOMATIC CAR BODY WELDING SPOT INSPECTION SYSTEM AND ITS CONTROL METHOD

CROSS REFERENCE TO RELATED APPLICATION

This application claims priority to European application number 17204928.0 filed Dec. 1, 2017, the entire contents of which are hereby incorporated by reference in its entirety.

FIELD OF THE INVENTION

This invention relates to a system and method of car body inspection, especially an automatic inspection system of car body welding spots and its control method.

BACKGROUND OF THE INVENTION

Punching, welding, coating and assembly are four processes of car body manufacturing, in which the welding process plays a critical role for the rigidity, safety performance, bearing capacity and comfort of the car body. At present, technology of spot welding is commonly applied to automobile production. The spot welding is a rapid and economic method of connection, and a main connection mode for numerous metal plates in the car body. However, the original parameters of welding plates, such as thickness of plate, surface cleanness, warp, and change of process parameters and operating condition in welding will affect welding quality. Therefore, the inspection of the quality of car body welding spots is an important measure to ensure a high quality of the car body and improve the performance of the automobile.

At present, the welding spot inspection methods mainly include destructive inspection methods and nondestructive inspection methods. A destructive inspection method is a mechanic test method which damages the welding spot mechanically, and detects are detected according to material characteristics of the fracture surface. This method is only used for sampling tests, with disadvantages such as being time-consuming and destructive. The nondestructive inspection is mainly ultrasonic inspection. The ultrasonic wave has strong power of penetration and produces reflected waves on upper and lower interface edges, the features of the reflected waves are used to determine whether a defect exists in the welding spot and to analyze and determine the nature, location and size of the defect. However, a coupling agent needs to be applied in ultrasonic inspection. The process for application and removal of the coupling agent is complex, and it is difficult to execute automatic inspection by a robot holding the probe.

There are 2000-4000 welding spots in the car body generally. Prevalent inspection methods depend on subjective judgment excessively, with low reliability, most inspections are done manually or offline, which lag far behind the rhythm of automobile manufacturing. Even if an automatic inspection scheme is adopted, there are always errors in the positions of welding spots for each batch of the car body. It is difficult to determine the position of a welding spot accurately for automatic inspection. The development of the automobile industry is restricted by the low efficiency of car body welding spot inspection methods, therefore, it is very urgent for the automobile industry to develop high-speed automatic inspection equipment for car body welding spots so as to achieve automatic and continuous inspection of car body welding spots in the production line or in separate positions offline.

SUMMARY OF THE INVENTION

This invention is to provide an automatic inspection system of car body welding spots and a control method thereof, which can locate the center of a welding spot accurately, perform the quality inspection for the welding spot, and reduce the inspection interval of each welding spot significantly.

The solution for above technical problem specified in this invention is to provide an automatic inspection system of car body welding spots and a control method thereof, comprising a controller and a robot, an eddy inspection probe, and a visual system, wherein the robot holds a camera and a probe device, the probe device targets at a car body welding spot and forms a first included angle with the camera. Several lighting sources are distributed around the camera, forming a second included angle with the camera. The camera is connected with an Image Collecting and Processing Device to obtain position data of welding spots in the car body, a PLC controller is connected with the Image Collecting and Processing Device by a network, and foresaid PLC controller rectifies the position of the probe on the robotic arm according to the position of the welding spot in the car body.

This invention further provides a control method for the automatic inspection system of car body welding spots described above, including the following steps: S1: Align the probe device on the robotic arm with a welding spot in the car body; S2: Photograph the position of the welding spot in the car body with the camera to obtain an image with a certain tilt; S3: Correct the tilt image by the Image Collecting and Processing Device according to orthographic projection shooting angle to obtain the measured position of the welding spot, and calculate the offset between the measured position and a preset point; S4: Correct the position of the probe on the robotic arm by the controller according to the offset of the welding spot in the car body; S5: Control the probe to inspect the quality of the welding spot in the car body.

Compared with existing technology, this invention has the following advantages: the automatic inspection system of car body welding spots and its control method specified in this invention can reduce the inspection interval of each welding spot significantly by a robot vision-based solution, improve identification accuracy of welding spots by design of light source at a certain angle, and the configuration of the camera and the probe at certain angel can release the requirement of process that the camera should be perpendicular to the workpiece in photography. The flexible probe holding device makes the contact surface of the probe vertical to the tested surface all along; at the same time, the equipment volume is significantly reduced by the optical path design of the multi reflector.

EXPLANATION OF ILLUSTRATION

Wherein:

| | | |
|---|---|---|
| 1. Car body | 2. Camera | 3. Probe device |
| 4. Lighting Source | 5. Robotic Arm | 6. Control Cabinet of Robotic Arm |
| 7. Probe Control Box | 8. PLC Controller | 9. Human-machine Interface |
| 10. Image Collecting and Processing Device | 11. Camera Cable | 12. Eddy Probe Cable |
| 13. Robot Cable | 14. Network Cable | 15. Switch |
| 16. Aluminum Frame Support | 17. Flange Plate | 18 First L-shaped Supporting Bar |
| 19. Second L-shaped Supporting Bar | 20. Wedge Connector | 21 Reflector |
| 301 Cylinder | 302 Rack | 303 Pneumatic slider |
| 304 Tension spring | 305 Suspension bracket | 306 Eddy probe |
| 307 Swinging connection part | 3061 Eddy magnet exciting coil | 3062 Excitation magnet force line |
| 3063 Eddy inspection coil | 3064 Welding spot nucleus area | |

MODE OF IMPLEMENTATION

This invention is further illustrated by the figures showing preferred embodiments of the invention.

Figure 1:
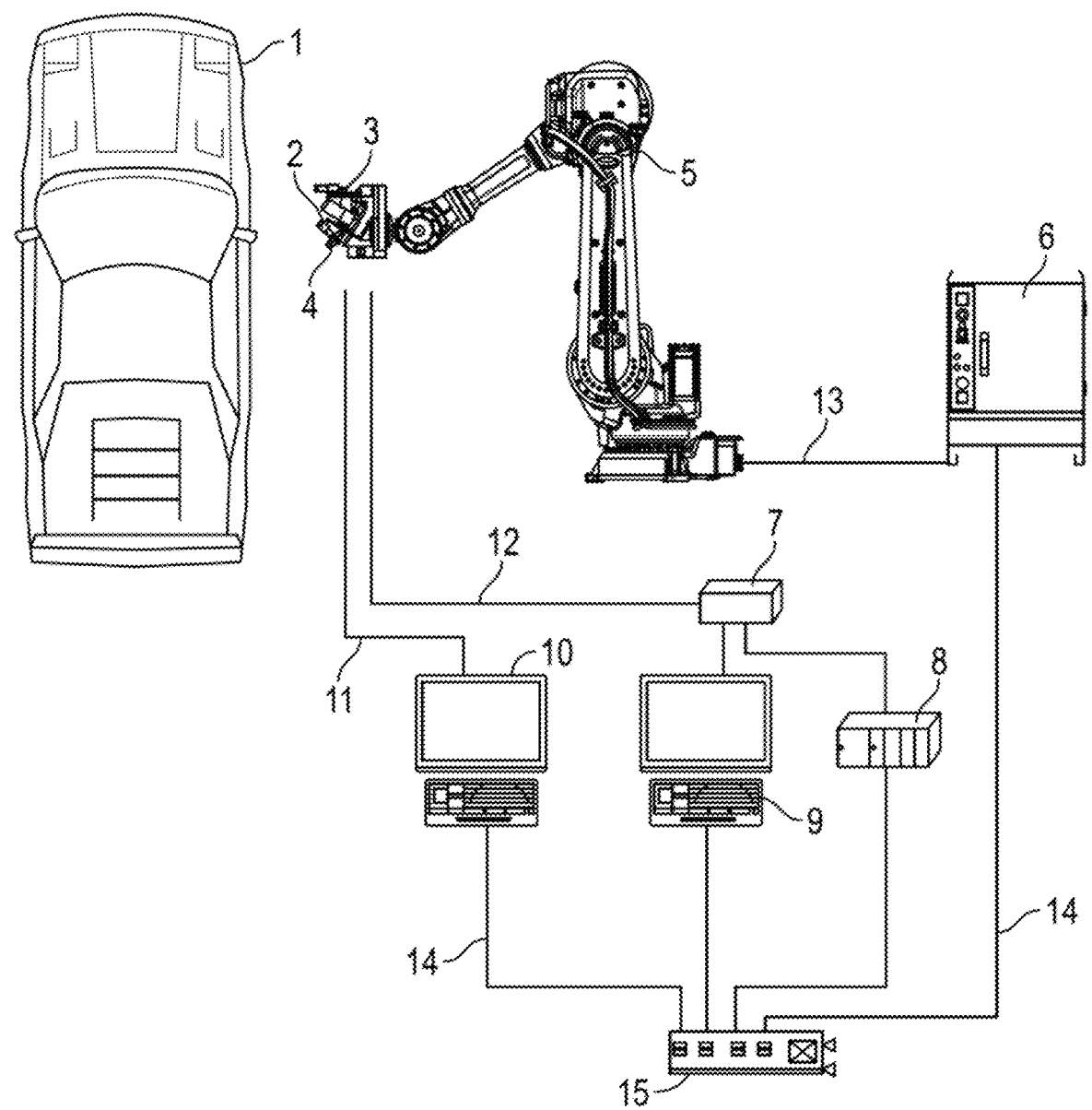
FIG. 1 shows the structure of the automatic inspection system of car body welding spots specified in this invention.

FIG. 1 illustrates the structure of the automatic inspection system of car body welding spots specified in this invention. As shown in FIG. 1, the automatic inspection system of car body welding spots in this invention comprises the PLC controller 8 and the robotic arm 5, wherein the robotic arm 5 holds the camera 2 and the probe 3, a first included angle is formed between the camera 2 and the probe 3, several lighting sources 4 are distributed around the camera 2, a second included angle is formed between each of the lighting sources 4 and the camera 2, the camera 2 is connected with Image Collecting and Processing Device 10 to collect position data of welding spots in the car body, the PLC controller 8 is connected with Image Collecting and Processing Device 10 by a network, and the PLC controller 8 corrects the position of the probe on the robotic arm 5 according to the position of a welding spot in the car body. The ranges of first included angle and second included angle are 30°~60°, preferably 45°. The probe 3 is an eddy probe, and the PLC controller 8 can be replaced with an IPC or SCM.

Figure 2:
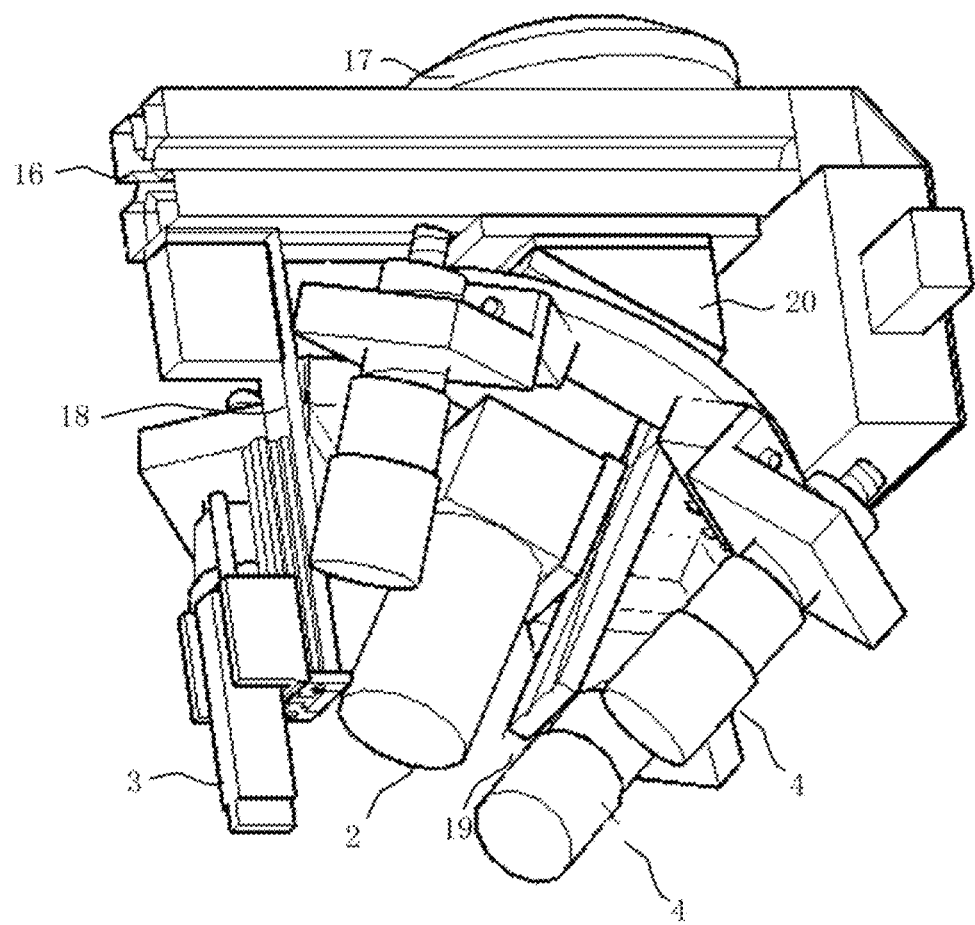
FIG. 2 shows the distribution of the camera, probe and lighting sources on the robotic arm of the automatic inspection system of car body welding spots specified in this invention.

FIG. 2 illustrates distribution of the camera, probe and lighting source on the robotic arm of the automatic inspection system of car body welding spots specified in this invention. As shown in FIG. 2, in the automatic inspection system of car body welding spots in this invention, the aluminum frame support 16 is configured on the robotic arm 5, the aluminum frame support 16 is installed on the robotic arm 5 by the flange plate 17, the probe 3 is fixed on the first L-shaped supporting bar 18, the first L-shaped supporting bar 18 is perpendicular to and fastened with the aluminum frame support 16; the camera 2 is fixed on the second L-shaped supporting bar 19, and the second L-shaped supporting bar 19 is connected with the aluminum frame support 16 by the wedge connector 20.

Figure 3:
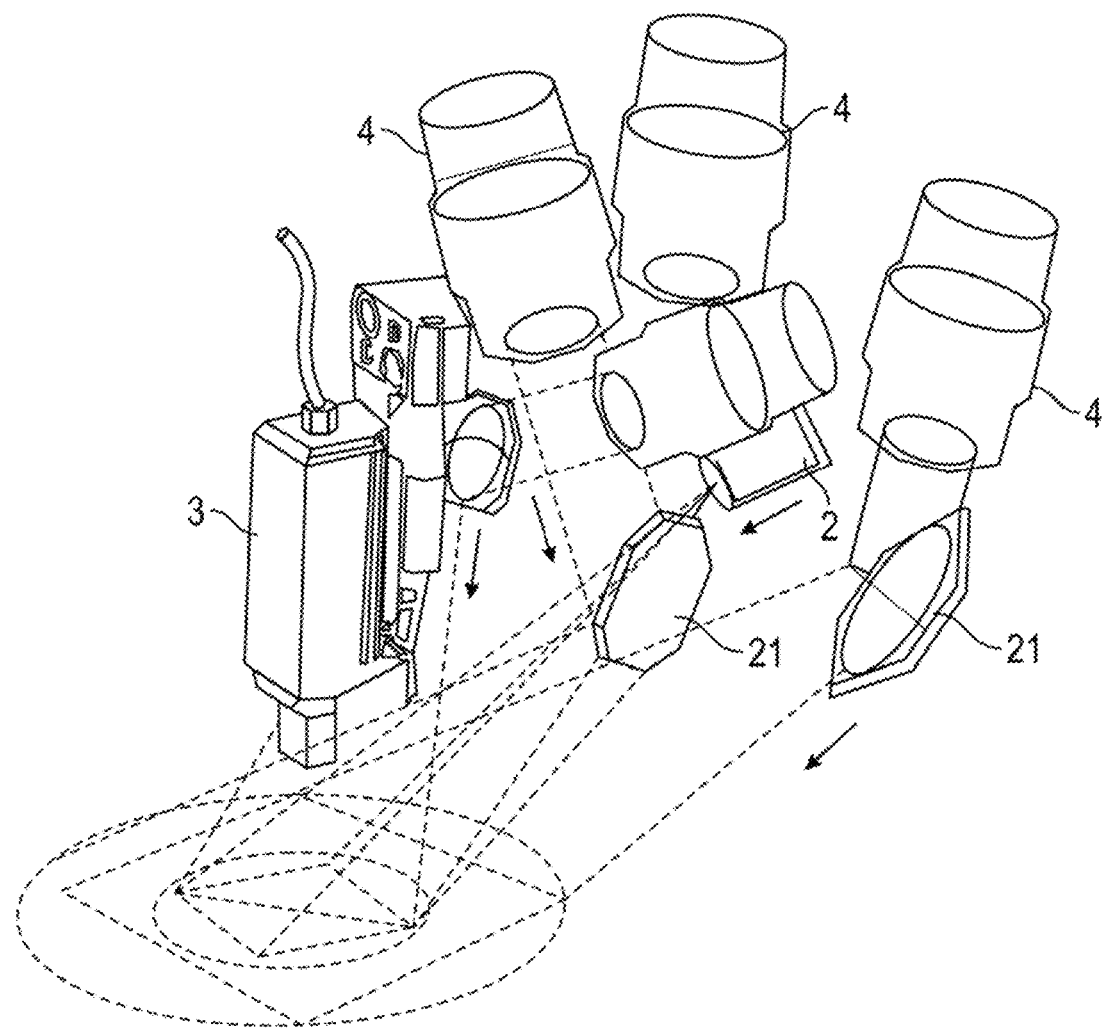
FIG. 3 shows the light path reflection formed by LED lighting sources and the reflector.

As shown in FIG. 3, the lighting source is an LED lighting source, and several LED lighting sources are distributed around the external circumference of the camera at equal radian and the light is reflected by reflectors 21. In the case of no obvious gray level difference between the welding spot and the background, lighting sources 4 at a certain angle with the camera are controlled with software to lighten the car body successively and obtain images with different direction of shadow. By superposition of the images with different directions of shadow, the central position of the welding point without obvious change of gray level and with concave-convex change can be determined by calculation. The volume of the measuring system is significantly reduced by the optical path design of the multi reflector and telescoping probe.

Figure 4:
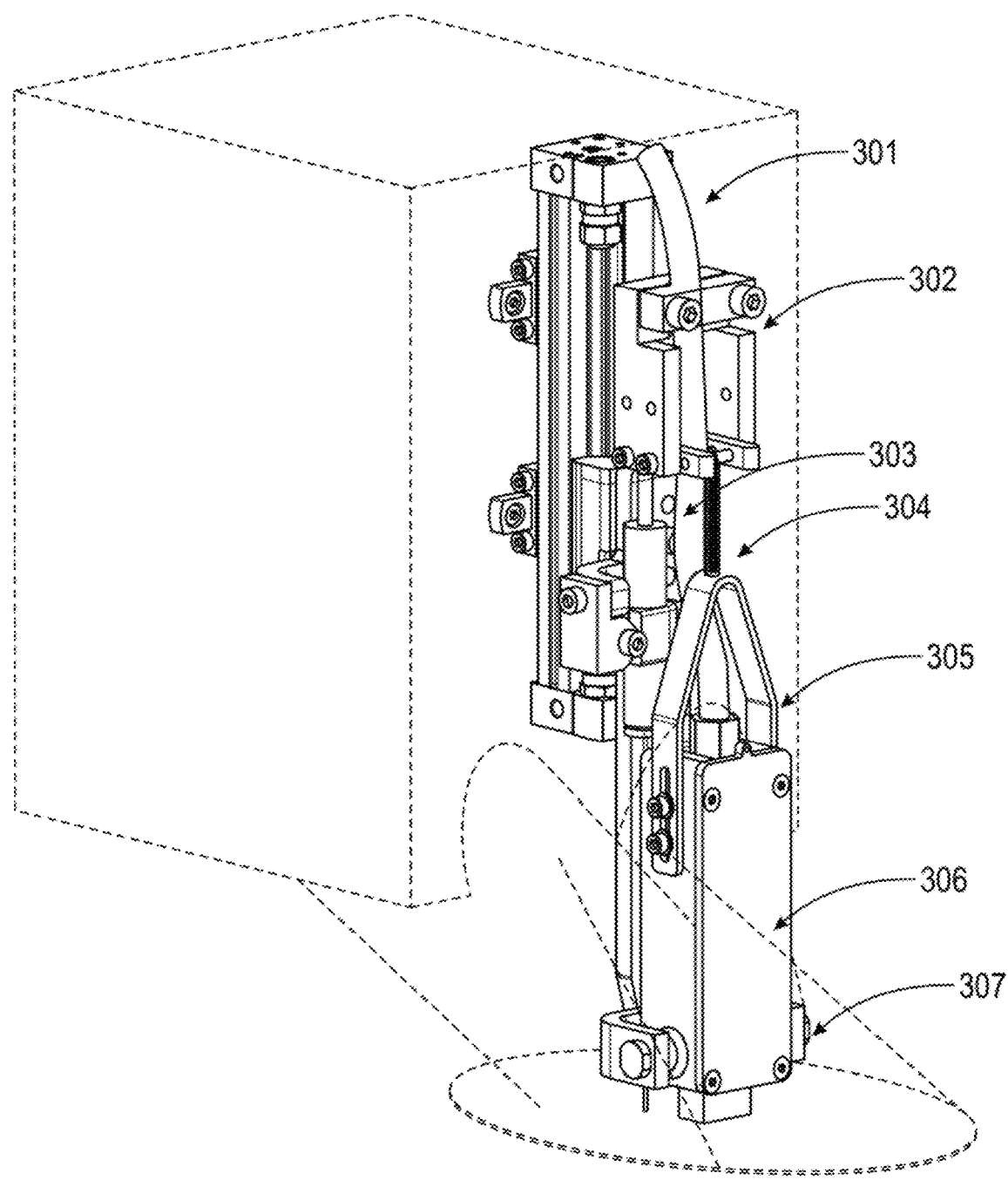
FIG. 4 shows the structure of the probe device with telescoping and swinging function.

As shown in FIG. 4, the probe device comprises an eddy probe 306, and a cylinder 301, the eddy probe 306 is connected with a swinging connection part 307 by a rotatable holding base, the cylinder 301 is fixed on the camera's box, the cylinder 301 is connected with the rotatable holding base of the swinging connection part 307 by a pneumatic slider 303, the swinging connection part 307 is connected with one end of a suspension bracket 305, and another end of the suspension bracket 305 is fixed on the rack 302 by a tension spring 304; the swinging connection part 307 may swing front and back and right and left to achieve a flexible connection mechanism structure in three free directions.

Figure 5:
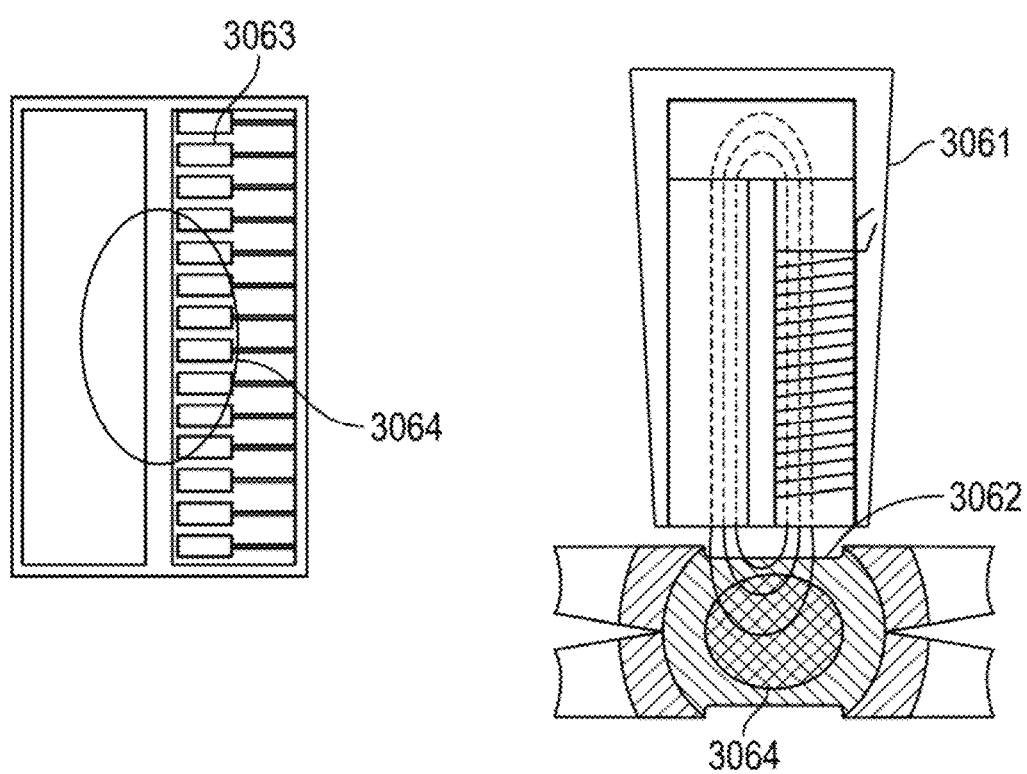
FIG. 5 shows distribution of the coil in the eddy probe and welding spot inspection.

As shown in FIG. 5, the eddy probe 306 according to the invention comprises a plurality of eddy inspection coils 3063 in linear arrangement, the eddy inspection coils 3063 being wound onto the eddy magnet exciting coil 3061. The eddy magnet exciting coil 3061 excitation magnet force line 3062, we record the self-induced electromotive force of inspection coils 3063 and compare the difference of each eddy inspection coil 3063 which is in linear arrangement. We can get the size of the welding spot nucleus area 3064.

Figure 6:
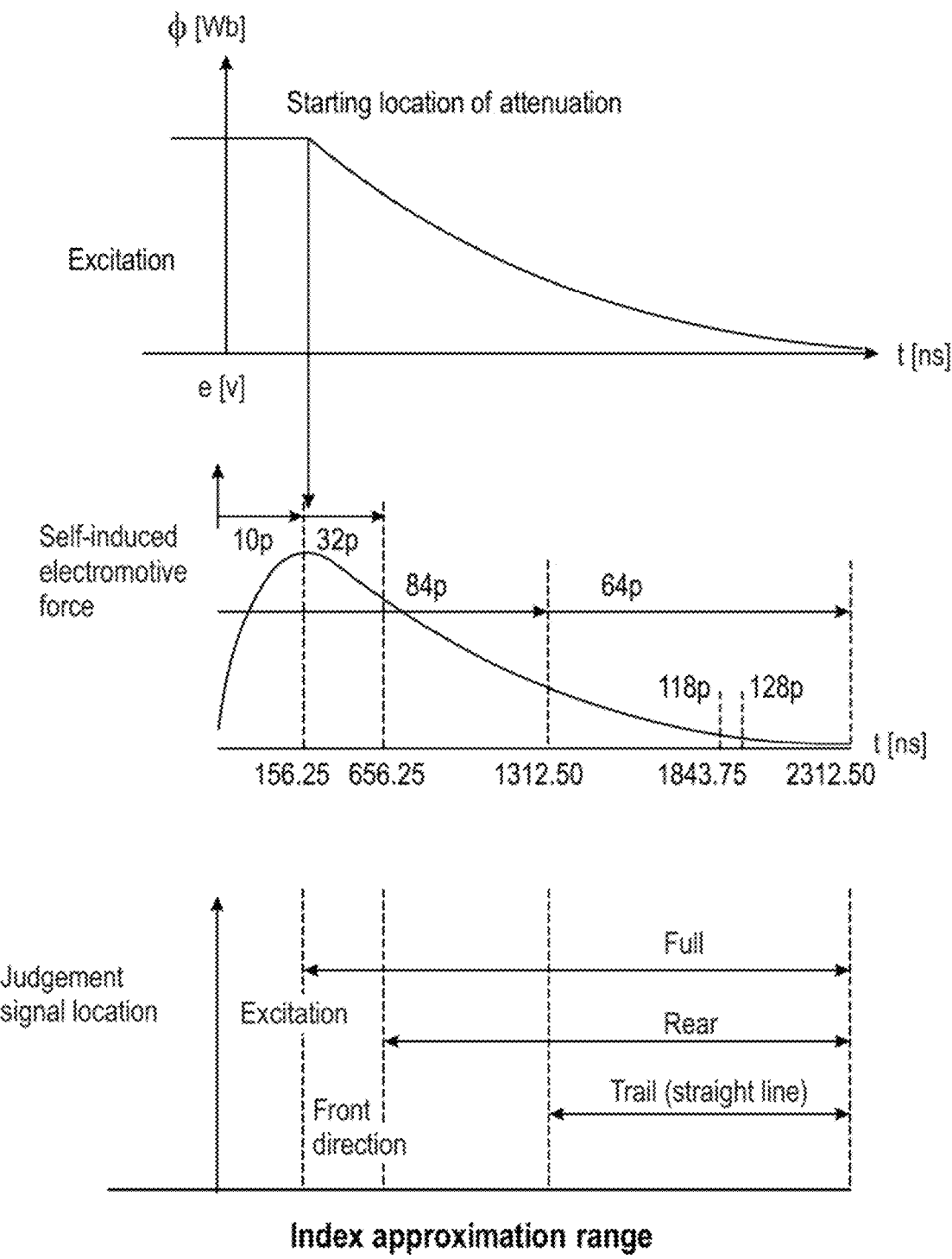
FIG. 6 shows selection of the location with largest difference on the full wavelength as the location target.

FIG. 6 shows the curve of magnet excitation coil 3061, and the record curve of each inspection coil 3063. We record 148 sample points for each inspection coil. The first 10 sample points are the reaction of the exciting current. The rest of 138 sample points is the signal of the self-induced electromotive force. Generally, the organization of a welding spot's nugget is changed after welding. So its self-induced electromotive curve is different from that of a cold-joint or normal material. In accordance with the invention, the range and size of the nugget can be obtained through comparing the difference of these linear arranged coil's signal curves. Sometimes it is difficult to judge a nugget through comparing the full range of the self-induced electromotive curve, in particular if the quality of the nugget is close to a critical point. Then, in accordance with the invention it is advantageous to choose a difference range of the recorded curve as judgment location according to the organization of the nugget. Since the difference organization of nugget has difference sensitive reaction area in the full recorded curve, it is advantageous to just judge the quality of the nugget by using a specific section of sample points and amplify these difference curves. Then it is easier to get a reliable result. For example 118-128P can be used as judgment location for the galvanized sheet. It can be selected to judge in front area, rear area or full area of the sample points according to difference organization of nugget.

Figure 7:
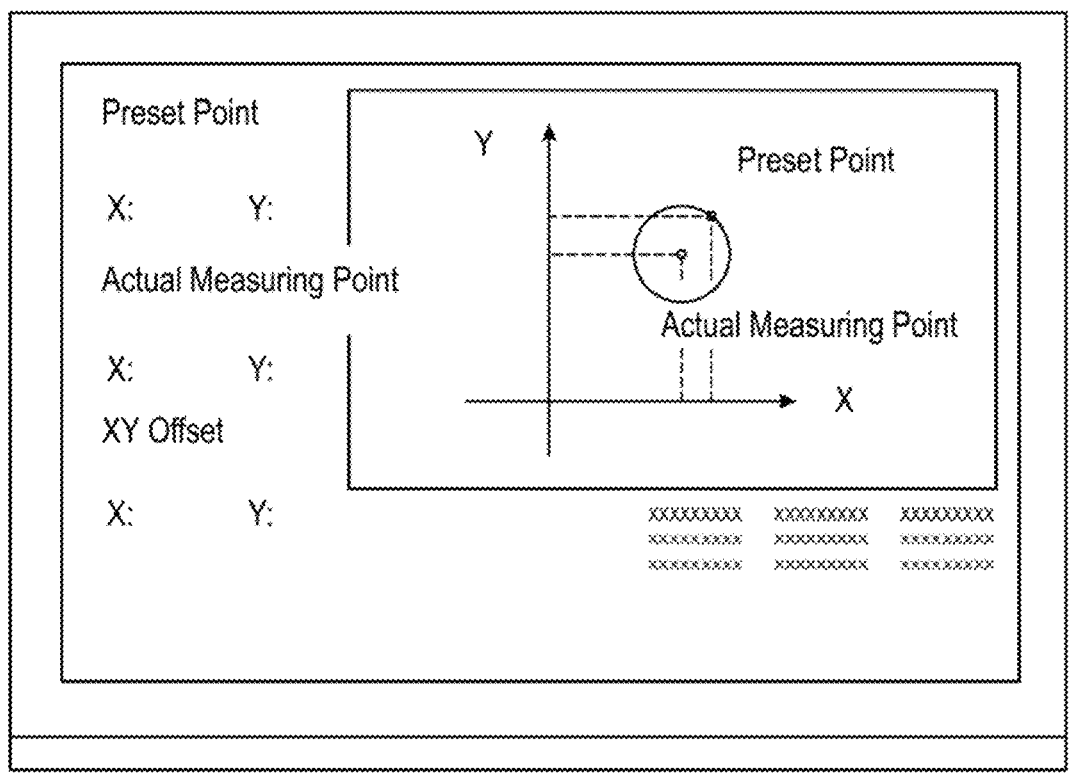
FIG. 7 shows the position rectification of welding spot in the car body specified in this invention.

FIG. 7. shows the visual system window. We detect the position of the actual measuring point and calculate the offset of a preset point. Send this offset to robot and guide probe to the corrected position to detect welding spot quality.

It can be seen that the automatic inspection system of car body welding spots in this invention comprises a robot system, a Visual Identification System, an eddy inspection system and a PLC control system. Main components and functions of a preferred embodiment of the system in accordance with the invention are as follows:

1. Robot System

The robot system comprises the robotic arm 5 and its control cabinet 6. Before operation, the robot is programmed and demonstrated by a robot engineer according to welding spots of client to be inspected. The robot can be operated cover all the welding spots of the client to be inspected.

2. Visual Identification System

In online inspection or offline inspection, there is always deviation between the position of welding spot in new car body and historical data the robot obtained. This requires visual system to re-position, calculate the deviation and lead the robot to actual position of welding spot. As shown in FIG. 1 and FIG. 2, Visual Identification System comprises an industrial camera, several lighting sources forming a certain angle with the camera, a visual mechanism, a mechanic fixture mechanism at a certain angle with the probe, and a computer operating visual identity software.

In general mode, the welding spots are photographed and identified by the visual system. In the case of obvious gray level difference between the welding spot and the background, the system can calculate the center of the welding spot and give value of offset.

In the case of no obvious gray level difference between the welding spot and the background, lighting sources at a certain angle with the camera are controlled with software to lighten the car body successively and obtain images with different direction of shadow. By superposition of the images with different directions of shadow, the central position of a welding point without obvious change of gray level and with concave-convex change can be determined by calculation. The volume of the measuring system is significantly reduced by the optical path design of the multi reflector and telescoping probe.

Generally, the camera is perpendicular to the measured surface in optical measurement. After photography, the mechanism is rotated to the workpiece surface perpendicular to the probe for measurement. To reduce the cycle time, time for mechanical switching can be saved for this invention. In this invention, angle of image is corrected with software, and thus position inspection can be done directly after photography.

3. Eddy Inspection System of Linear Coil

Eddy Inspection System comprises an eddy probe with linear eddy inspection coil, an eddy inspection control box, and a computer for operating eddy inspection software and saving the results. Without the process of application and removal of coupling agent in ultrasonic inspection, the eddy inspection of welding spot can simplify the operation process significantly, and enables manual measurement to be replaced by the robot holding the probe. In order that the photographing is not prevented, the invention uses the pneumatic slider to control the telescoping of the eddy testing mechanism. The eddy testing mechanism is upward telescoping during photographing with the camera, and during the inspection after positioning, the eddy testing mechanism stretches out.

This invention can measure the diameter of a nugget with the linear eddy inspection coil. Meanwhile, a mechanical structure with a 3-dimensional flexible connection is designed to ensure that the probe is perpendicular to the workpiece surface real-time in inspection. When the quality of a welding spot is close to a critical point, because it is difficult to judge the quality according to final interaction strength, the location with largest difference in time can be selected from the full wavelength for judgment. For example, we choose front wavelength or rear wavelength or only some period of sample points as judgement location. As shown in FIG. 6 we preferably only use the period of 118 point to 128 point.

4. PLC Control System

The PLC Control System preferably comprises a Siemens PLC, relevant electrical hardware, an electric control cabinet, a human-computer interface computer, and a switch.

The PLC Control System is responsible for coordination between the robot, the visual system and the Eddy Inspection System, as well as the interaction and communication with upstream and downstream controllers of system online, controlling the frame into or out of the online system, filing of quality inspection results, and the quality feedback results of upper-level systems.

This invention further provides an automatic inspection and control method of car body welding spots, including the following steps:

S1: Align the probe device on the robotic arm with a welding spot in the car body;

S2: Photograph the position of the welding spot with the camera to obtain images with a certain tilt;

S3: Correct the tilted images with an Image Collecting and Processing Device to obtain images as if they were photographed at orthographic projection shooting angle, so as to determine the actual position of the welding spot, and calculate the offset between the measured position and a preset point;

S4: Correct the position of the probe on the robotic arm with the PLC controller according to the offset of the welding spot in the car body;

S5: Control the probe device to inspect the quality of the welding spot in the car body.

The operation sequence of the system is given below: first, the robot engineer teaches the robot concerning the welding spot inspection, to enable it to remember the location of all welding spots approximately. Then client selects the welding spot to be inspected according to requirements. Click to operate it automatically. PLC sends a command to move the robot according to the location selected by the client. The robot sends a command of photography to the visual system after it reaches above the designated welding spot. The visual system generates images by photography. PLC sends the optimal parameter for identification of images according to the number of the welding spot. If the center of the current welding spot cannot be identified, PLC will send new parameters for identification of images according to a sequence of parameters in the parameter library. After the center of the current welding spot is identified, it is compared with the inspection position of the robot preset, then the offset between the position of the center identified and the position of the center preset is sent to the robot, the visual identity parameter used this time is preset as the optimal parameter for use later. The robot moves the eddy inspection probe to the welding spot location for inspection according to the offset, saves the result in the computer. Then the next welding spot is inspected. After inspection of all welding spots, PLC notices the downstream equipment to output the car body.

The above is the measuring method of single robot system. To meet the requirement covering all welding spots in the car body, a four-robot system is designed in this invention. The control method and logic are the same as above. The control method and logic for offline system and online system are the same, but the offline system does not need to take part in the communication with the car body product line.

The automatic inspection system of car body welding spots specified in this invention and its control method thereof can reduce the inspection interval of every welding spot significantly by the solution of robot visual guidance, with specific advantages such as: 1. the solution of robot visual guidance can reduce the inspection interval of every welding spot significantly from several minutes to 5 seconds now. 2. The system covers all welding spots in the car body by the four-robot solution. 3. The center of the welding spot can be calculated accurately by Algorithm treatment on images after mechanical visual photography, with deviation of 0.5 mm or below. 4. The camera and the probe are distributed at a certain angle to save the time required for making the camera perpendicular to the workpiece in photography, and one second of operation can be saved. 5. The lighting source is designed at a certain angle to identify the center of the welding spot without change of gray level but with convex-concave change. 6. The volume of the visual system is significantly reduced by the optical path design of the multi reflector. 7. Setting and use of self-learning parameters can improve identification efficiency of the visual system and avoid fussy manual setting of parameters. 8. Compared with the ultrasonic inspection, the eddy inspection technology can simplify the process significantly, and achieve the inspection of welding spots in the car body by the robot holding the probe. 9. The arrangement of the linear eddy inspection coil makes it feasible to measure the actual diameter of the weld nugget, and detection sensitivity is up to 0.7 mm. 10. Flexible mechanism connection may ensure the automatic alignment and plumbing of the eddy probe to the tested surface. 11. A staged inspection standard may be used to set more accurate parameters according to the different testing materials.

Above disclosure of preferred embodiments of this invention is not intended to limit this invention. Technicians in this field can make slight modifications and improvements within the spirit and range of this invention, and the scope of protection of this invention is subject to the Claims herein.

The invention claimed is:

1. An automatic inspection system of welding spots in a car body, the system comprising a controller, a robotic arm, a probe device comprising a probe, and a visual system comprising a camera and an image collecting and processing device, wherein the robotic arm holds the camera and the probe device, the probe device aligns with a welding spot in the car body, a first included angle is formed between the camera and the probe device, several lighting sources are distributed around the camera, forming a second included angle with the camera, the camera is connected with the image collecting and processing device to determine the position of the welding spot in the car body, the controller is connected with the image collecting and processing device by a network, and is configured to rectify the position of the probe device on the robotic arm according to the position of the welding spot in the car body;
wherein the probe device comprises a flexible mechanism telescoping in x, y, z direction, the probe device is configured to stretch out during measuring, the probe device comprises an eddy probe, a cylinder and related fix parts, wherein the eddy probe is connected with a swinging connection part by a rotatable holding base, the cylinder is fixed on the camera's box, the cylinder is connected with a rotatable holding base of the swinging connection part by a pneumatic slider, the swinging connection part is connected with one end of a suspension bracket, and another end of the suspension bracket is fixed on the rack by a tension spring.

2. The automatic inspection system of car body welding spots specified in claim 1, wherein the robotic arm is provided with an aluminum frame support which is installed on the robotic arm by a flange plate, the probe device is fixed on a first L-shaped supporting bar which is perpendicular to and fastened to the aluminum frame support, foresaid camera is fixed on a second L-shaped supporting bar which is connected with the aluminum frame support by a wedge connector.

3. The automatic inspection system of car body welding spots specified in claim 1, wherein the first included angle is in the range between 30° and 60°, and the second included angle between 30° and 60°.

4. The automatic inspection system of car body welding spots specified in claim 1, wherein the lighting source is an LED lighting source, and several LED lighting sources are distributed around the external circumference of the camera at equal radian and the light is reflected by a reflector.

5. The automatic inspection system of car body welding spots specified in claim 1, wherein the eddy probe comprises a plurality of eddy inspection coils in linear arrangement.

6. An automatic inspection and control method of car body welding spots, employing the automatic inspection system of car body welding spots specified in claim 1, comprising the following steps:
S1: Align the probe on the robotic arm with a welding spot in the car body;
S2: Photograph the position of the welding spot with the camera to obtain images with a certain tilt;
S3: Correct the tilted images with the image collecting and processing device to obtain images as if they were photographed at orthographic projection shooting angle, so as to determine actual position of the welding spot, and calculate the offset between the measured position and a preset point;
S4: Correct position of the probe on the robotic arm according to the offset;
S5: Control the probe to inspect the quality of the welding spot in the car body.

7. The automatic inspection and control method of car body welding spots specified in claim 6, wherein a fourth of the car body is covered by each robotic arm, and the position of the probe on the robotic arm is corrected according to the position of the welding spot in the car body.

8. The automatic inspection and control method of car body welding spots specified in claim 6, wherein, in S2, in order to enlarge the difference of gray level between the welding spot and the background, several lighting sources, which form a certain angle with the camera and are controlled by software, lighten the car body successively in different directions and obtain images with different directions of shadow, and the position with concave-convex change is determined as the central position of the welding spot via calculation after superposition of images with different directions of shadow.

9. The automatic inspection and control method of car body welding spots specified in claim 6, further comprising the steps of presetting a series of referential library for identification of images, identifying the center of a welding spot according to previous optimal parameters in inspecting image of the welding spot of new car body at same position; in the case of inability to identify the center of the welding spot, identifying the center automatically with parameters from the parameter library.

10. The automatic inspection and control method of car body welding spots specified in claim 6, wherein the telescoping of the probe device is controlled by a movable slider and the probe is upward telescoping during photographing with the camera, and during the inspection after positioning, the probe stretches out to achieve prevention of the probe from sheltering light path and reduce the mechanism volume as soon as possible.

11. The automatic inspection and control method of car body welding spots specified in claim 6, wherein in Step S5, when the welding spot is nearby a critical point of good and bad result, the waveform with largest difference is selected from the full waveform to identify the location.

\* \* \* \* \*